United States Patent [19]

Sukert

[11] 4,198,784
[45] Apr. 22, 1980

[54] VESSEL FOR SUPPORTING AND AUTOMATICALLY PROVIDING LIQUID TO VEGETATION

[76] Inventor: Haven L. Sukert, 6500 W. 43rd, Suite 406, Houston, Tex. 77092

[21] Appl. No.: 908,005

[22] Filed: May 22, 1978

[51] Int. Cl.$^2$ ............................................. A01G 27/00
[52] U.S. Cl. ............................................ 47/79; 47/71
[58] Field of Search .......................... 47/66, 79–82, 47/71

[56] References Cited

U.S. PATENT DOCUMENTS

| 1,498,145 | 6/1924 | Beamesdorfer et al. | 47/79 |
| 1,815,676 | 7/1931 | Medveczky | 47/79 |
| 2,344,202 | 3/1944 | Carlson | 47/80 |
| 2,638,716 | 5/1953 | Luipersbek | 47/79 |
| 2,651,884 | 9/1953 | Werner | 47/80 |
| 2,865,137 | 12/1958 | Longacre | 47/80 |
| 2,885,825 | 5/1959 | Longacre | 47/79 |
| 3,106,043 | 10/1963 | Ferrand | 47/81 |
| 3,552,058 | 1/1971 | Fici | 47/80 |
| 3,758,987 | 9/1973 | Crane | 47/80 |

FOREIGN PATENT DOCUMENTS

| 1024483 | 1/1953 | France | 47/80 |
| 2067474 | 8/1971 | France . | |
| 2250469 | 6/1975 | France | 47/81 |
| 45098 | 10/1960 | Poland . | |
| 66056 | 8/1913 | Switzerland | 47/81 |
| 1096014 | 12/1967 | United Kingdom . | |

*Primary Examiner*—Robert E. Bagwill
*Attorney, Agent, or Firm*—Arnold, White & Durkee

[57] ABSTRACT

A vessel for automatically sustaining vegetation includes a lower container for storing a reservoir of liquid, an upper container for supporting the vegetation and receiving liquid from the lower container, and a flow regulator for controlling the flow of liquid to the vegetation. The upper container is engageable with the lower container and includes a stem, defining at least one passageway, for extending into the liquid. The flow regulator includes a member which defines a flow port and which is rotatably attached to the stem of the upper container. In one embodiment the flow regulator may be controlled from outside the vessel by means of a control arm extending from the member. The upper container preferably includes drain holes permitting the drainage of excess liquid from the vegetation and permitting aeration of the vegetation, while the lower container preferably is transparent for viewing the liquid level and includes a fill/drain opening for adding liquid without disassembling the vessel and for permitting the drainage of excess liquid from the lower container. The upper and lower containers are preferably tapered in their cross-sectional dimensions from top to bottom to permit the nesting of a plurality of such vessels and thereby facilitate handling, storage, and shipment. The cross-sectional dimensions of the upper and lower containers are additionally preferably arranged so that the assembled vessel presents a unitary appearance with a constant taper from top to bottom.

10 Claims, 4 Drawing Figures

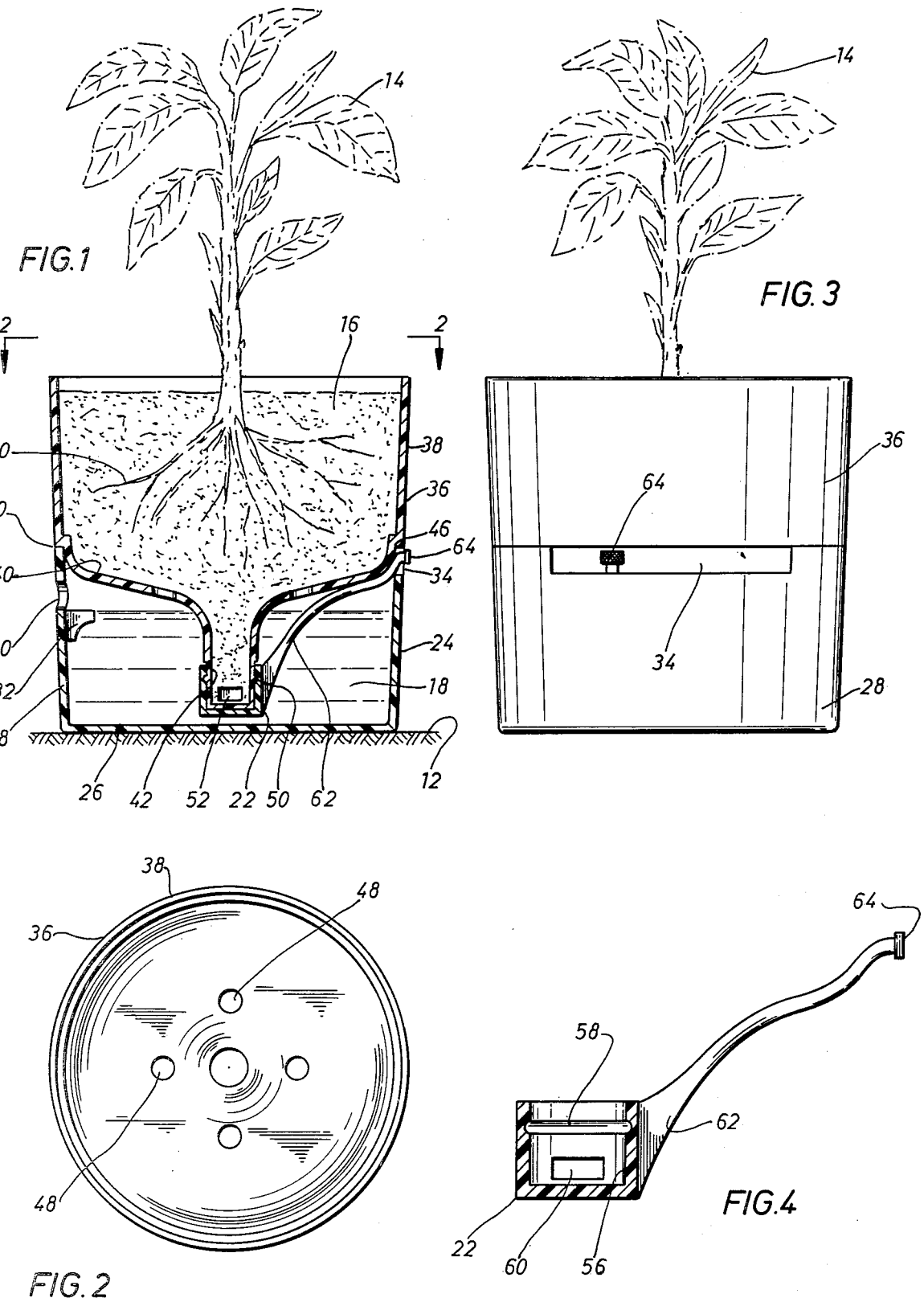

VESSEL FOR SUPPORTING AND AUTOMATICALLY PROVIDING LIQUID TO VEGETATION

BACKGROUND OF THE INVENTION

This invention relates generally to containers for vegetation and, more particularly, to vesels which automatically provide liquid to the vegetation held by the vessel.

Containers are frequently utilized to hold growing vegetation, such as flowers, house plants, and the like. A plant is supported in such a vessel by a suitable medium, such as potting soil, and the vessel is placed in a location where the vegetation will receive suitable light for proper growth. Also essential for the adequate growth of the plant is a sufficient supply of a liquid such as water. In the simplest type of plant vessel, the water supply must be provided by the person caring for the plant, who pours water into the vessel when it appears necessary. When this method is used, care must be taken to ensure that the plant receives neither too little water, in which case it might dry out, nor too much water, in which case the roots of the plant might rot.

In order to provide such vegetation with the proper amount of moisture, and in an attempt to reduce the amount of attention which must be given to such plants, devices have been proposed to provide some form of automatic watering for container vegetation. In some of these devices, a first container is used for storing a reservoir of liquid, which may include water as well as other nutrients, such as liquid fertilizers. A second container for supporting the vegetation is arranged so that some means of communication between the reservoir of liquid and the roots of the vegetation is provided, thereby permitting a flow of the liquid from the reservoir in the first container to the roots in the second container.

In some such automatic watering devices, an upper container holding the vegetation is adapted to include a portion which fits inside a lower container in which the liquid is stored. This portion of the upper container is arranged to project downwardly into the liquid, and one or more openings provided in this portion permit the liquid to pass into the upper container and thence to the roots of the plant, where the moisture may be absorbed by the vegetation.

Although such devices may reduce the number of times a container plant must be watered, it is also desirable to control the amount of liquid which is permitted to flow to the roots of the vegetation planted therein. Thus self-watering pots have been proposed which include a member resting in a reservoir of liquid, the member having an opening of a preselected dimension through which the liquid is permitted to pass. In such designs, the flow passages for the liquid are to be made variable in size by the provision of some adjustment means, such as insertable disks of different sizes or of varying porosity. Such adjustment provisions as are proposed, however, require disassembly of the vessel to change component parts and alter the liquid flow rate. Therefore, it is desirable to provide such a vessel for containing vegetation in which the automatic supply of liquid to the vegetation may be regulated without the need for disassembling the vessel and exhanging parts.

Because of the multiple container design inherent in such self-watering vessels, as well as the need to store a reservoir of liquid within the vessel, such vessels normally present a volume available for holding a plant and soil which is less than the comparable volume which would be available in a conventional flower pot of similar external dimensions. Therefore, it is desirable to obtain a vessel for containing and automatically watering vegetation which will maximize the available volume for holding the vegetation within a vessel of a given overall size.

Because of the multiple component pieces which normally are included as part of such a self-watering vessel, such vessels frequently are relatively expensive to ship and handle. Thus, it is desirable to provide such a vessel for containing vegetation which may be compactly stored and packaged for shipping and handling purposes.

Such automatic vessels periodically require filling to maintain the supply of liquid contained therein. In some such designs, it is difficult to ascertain whether additional liquid is required without partially disassembling the container. Thus, it is desirable to provide such a vessel with a means for visually ascertaining the level of liquid contained therein without the need for disassembling the vessel.

Depending upon the type of vegetation contained in such a vessel, it may be desirable at times to eliminate the automatic feature of such a vessel and thereby permit watering of the vegetation by conventional means. Thus, it is desirable to provide such a vessel with a control which will shut off the automatic device for providing liquid to the vegetation.

In some such vessel designs, it is possible to overwater the plant contained therein by overfilling the container reservoir with liquid. Therefore, it is also desirable to provide an automatic vessel for vegetation which cannot be overfilled with liquid.

SUMMARY OF THE INVENTION

It is a general object of this invention to provide a new and improved vessel for supporting and automatically supplying liquid to vegetation. The invention includes a provision for adjusting the flow of liquid, which may be achieved from outside of the vessel without disassembling the vessel. In addition, the vessel is configured to maximize the available volume for holding vegetation, while the vessels may be nested for storage and shipment. Furthermore, the vessel includes protection against overwatering and includes a means to visually ascertain the level of liquid in the vessel. A vessel is provided which includes a lower container for storing a reservoir of liquid, an upper vegetation supporting container, engageable with the lower container and including a portion which defines at least one passageway for extending into the liquid and conveying a flow of the liquid to the vegetation, and a flow regulator engageable with the portion and defining at least one flow port of dimensions having a predetermined relationship to the cross-sectional dimensions of the passageway, the flow of liquid thus being proportional to that relationship.

According to one outstanding feature of this invention, the flow regulator includes at least one flow port, the flow of liquid into the vegetation being proportional to the correspondence between the passageway and the flow port. The flow regulator may also be adjusted so that no flow of liquid is permitted through the passageway and the vessel may thus be utilized as a conventional container for vegetation. The flow regulator may be adjusted from outside the vessel by means of a control lever, which is attached at an inner end to the flow regulator and includes an outer end which extends from the vessel through an aperture in the lower container.

In a more particular embodiment, the flow regulator feature of this invention comprises a cylindrical cap which is rotatably attached to the upper container by means of an annular ridge which is disposed upon the outer surface of the stem and cooperates with an annular groove disposed within the cap. This annular ridge and groove arrangement effects a fluid-tight seal between the cap and the stem, yet permits relative rotation between the cap and the stem to provide the adjustable feature of the invention.

As an additional feature, the upper container of a vessel made in accordance with this invention may further include one or more drain openings located above the level of the passageway thereby permitting excess liquid to drain from the vegetation and permitting the aeration of the vegetation.

The lower container of a vessel made in accordance with this invention may feature a fill/drain opening which is located above the level of the passageway and below the level of the drain openings, thereby permitting liquid to be added to the lower container and also permitting the drainage of any excess liquid from the lower container. As another feature, the lower container may further be provided with a splash shield disposed below the fill/drain opening to prevent the spillage of liquid out of that opening.

BRIEF DESCRIPTION OF THE DRAWINGS

The following drawing figures are provided to assist in an understanding of the preferred embodiment discussed herein, although it should be understood that the embodiment illustrated in the drawings is not considered to be limiting of the invention.

FIG. 1 is a side view in vertical cross section of a vessel and vegetation according to one embodiment of the present invention.

FIG. 2 is a top view of the upper container of the vessel illustrated in FIG. 1.

FIG. 3 is a side view in perspective of the vessel and vegetation illustrated in FIG. 1.

FIG. 4 is a side view in vertical cross section of the flow regulator for the vessel illustrated in FIG. 1.

DESCRIPTION OF A PREFERRED EMBODIMENT

Now referring to FIGS. 1 and 3, a vessel 10 for supporting and automatically providing liquid to vegetation is illustrated. The vessel 10 includes a lower container 24, an upper container 36, and a flow regulator 22.

In use, the vessel 10 is placed on a suitable supporting surface 12, such as a table, and the desired plant 14 is placed within the vessel and held in position by any suitable support medium such as the potting soil 16. An appropriate liquid 18 is added to the vessel and, according to an outstanding feature of this invention, is automatically supplied to the roots 20 of the plant 14 by passing through the flow regulator 22. The liquid 18 may be water or it may include water in combination with appropriate nutrient materials to promote plant growth, such as fertilizers.

The lower container 24 provides storage for the reservoir of liquid 18, which is to be supplied to the vegetation contained within the vessel 10. The lower container 24 includes a circular planar base portion 26, to which is attached side wall 28, which is frustroconical in shape. The lower container 24 may conveniently be manufactured of a transparent material so that the level of the liquid 18 may be viewed therein. A fill/drain opening 30 is provided in the wall 28 of the lower container 24, at a location and for a purpose which will be discussed in further detail below. Disposed directly beneath the fill opening 30 is a splash shield 32, which operates to prevent the liquid 18 from splashing or sloshing out of the fill/drain opening 30. Also provided in the side wall 28 of the lower container 24 is an aperture 34, whose function will be further discussed herein in connection with the flow regulator feature of this invention.

Upper container 36 includes an upper frustoconical portion 38, a lower frustoconical portion 40, of a reduced diameter, and a stem 42. A shoulder 46 engages the lower container 24 when the vessel 10 is assembled.

As shown more clearly in FIG. 2, drain holes 48 are provided in the lower frustoconical portion 40 of upper container 36 to drain excess liquid from the upper container and to provide aeration of the potting soil 16 and the roots 20 which are contained therein, as will be discussed further below in connection with the operation of the vessel. The stem 42, which is enclosed at its lower end, includes on its outer surface an annular ridge 50 which is adapted to engage an annular groove within the flow regulator 22, as will be discussed further below in connection with the function of the flow regulator. Passing through the side of stem 42 is a passageway 52, which permits a flow of the liquid 18 into the upper container 36 and thence to the roots 20. Although only one passageway is illustrated, multiple passageways may be provided in stem 42 as necessary to achieve the desired amount of flow.

Now referring to FIG. 4, the flow regulator 22, one outstanding feature of this invention, is illustrated. The flow regulator 22 is provided in the form of a cylindrical cap having an inner wall 56 which is adapted to closely engage the outer surface of the stem 42, illustrated in FIG. 1, when the flow regulator 22 is attached on the stem 42. Formed within the inner surface 56 is an annular groove 58. The annular groove 58 is positioned so that when the flow regulator 22 is snapped onto the stem 42, the annular groove 58 will cooperate with the annular ridge 50 on the stem 42 and thereby retain the flow regulator 22 in a rotatable position with respect to the stem 42, while effecting a substantially fluid-tight seal between the flow regulator 22 and the stem 42.

When the flow regulator 22 is thus attached to the stem 42, a flow port 60, which is formed in the side of the flow regulator 22, may correspond with the passageway 52 in the stem 42. The extent of cooperation between the passageway 52 and the flow port 60 is determined by the relative rotational position of the flow regulator 22 with respect to the stem 42. In this manner, the relative rotational position of the flow regulator 22 with respect to the stem 42 will regulate the flow of liquid 18 into the upper container 36, as will be further discussed below with respect to the operation of the vessel 10.

Another outstanding feature of this invention is the provision of a means by which the automatic supply of liquid to a plant may be adjusted in amount from outside the vessel 10. This adjustment may be conveniently provided, as shown in FIGS. 1, 3, and 4, by a control lever 62, which is attached at an inner end to the flow regulator 22, and includes an outer end 64 which extends outside the lower container 24, where it may be conveniently grasped for adjustment. As shown in FIGS. 1 and 3, an aperture 34 is provided in the lower container 24 so that the end 64 of the control lever 62 may extend outside the vessel 10. With the flow regulator 22 attached to stem 42, when the end 64 is moved laterally the flow regulator 22 will rotate with respect to the stem 42. This rotation will vary the flow of liquid 18 into the upper container 36 by varying the amount of cooperating area between the passageway 52 and the flow port 60.

Now referring to FIGS. 1, 2, and 3, the automatic vessel 10 operates in the following manner. The desired plant 14 is placed, together with a suitable support medium 16, such as potting soil, into the upper container 36. With the plant 14 in such a position, the roots 20 of the plant may extend downward and outward generally into the volume of the upper container 36. The flow regulator 22 is snapped onto the stem 42 so that the annular ridge 50 engages the annular groove 58 and the flow regulator is free to rotate with respect to the stem 42. The upper container 36 is then placed into position on the lower container 24 so that the lower container 24 is engaged by the upper container at the shoulder 46 and so that the outer end 64 of the control lever 62 projects through aperture 34. A suitable liquid 18 for sustaining the plant 14 is added to the lower container 24 through the fill opening 30, so that the stem 42 of the upper container 36 is immersed in the liquid 18, as shown in FIG. 1.

With the flow regulator 22 attached to the stem 42, the liquid 18 may flow into the upper container 36 by passing through the flow port 60 in the flow regulator 22 and thence through the passageway 52 in the stem 42. Since the flow regulator 22 is rotatable with respect to the stem 42 by means of the control lever 62, the area over which passageway 52 and flow port 60 cooperate to permit the flow of liquid 18 therethrough will be dependent upon the relative angular position of the flow regulator 22 with respect to the stem 42. In this manner, the flow of liquid into the upper container 36 may be controlled in amount by adjusting the angular position of the flow regulator 22 on the stem 42.

This adjustment may be conveniently implemented in the embodiment illustrated without disassembling the vessel 10. The control lever 62, as discussed above, includes an outer end 64 extending from the lower container 24. Movement of this end laterally will accomplish the desired rotation of the flow regulator 22 with respect to the stem 42. Furthermore, the relative size and area of the passageway 52 and the flow port 60 may be arranged so that the flow regulator 22 may be rotated to a point where the passageway 52 and the flow port 60 exhibit no cooperating area, thereby shutting off the automatic flow of liquid to the upper container 36 through stem 42. In this manner, the vessel 10 may be also utilized as a conventional plant container, permitting the plant to be watered from above in the ordinary manner.

As mentioned above, the drain holes 48 are provided in the lower frustroconical portion 40 of the upper container 36. These drain holes accomplish a dual function in the vessel 10. Should an excessive amount of liquid be accumulated in the upper container 36, as, for example, when the vessel is left outside in a rainstorm, the excess liquid may drain out of the drain holes 48 and into the lower container 24, thereby preventing any adverse effect on the vegetation contained within the vessel due to excess moisture. This gravity drainage feature is further promoted by the downwardly sloping surface of the lower frustroconical portion 40. The drain holes 48 also permit aeration of the potting soil 16 and the roots 20, by allowing the circulation of air from the fill/drain opening 30 to the upper container 36.

It is important to note that the fill/drain opening 30 is located below the level of the drain holes 48, yet above the level at which liquid may be drawn into the upper container through the passageway 52. By placing the fill/drain opening 30 below the drain holes 48, the liquid 18 within the lower container 24 not rise to a level which would permit the liquid to pass into the upper container 36 through the drain holes 48, since the liquid will instead pass out of the lower container 24 through fill/drain opening 30 and thereby not rise above the level of the fill opening. A splash shield 32 may also be conveniently provided in a suitable position beneath the fill/drain opening 30. The splash shield 32 will prevent the sloshing or splashing of liquid out of the fill/drain opening 30 during transient conditions of instability, such as when adding liquid to the vessel, moving the vessel 10, or other such times when the surface of the liquid 18 is likely to be in motion.

It will thus be appreciated that a new and improved vessel for supporting and automatically providing liquid to vegetation has been described. Convenient adjustment of liquid flow within the vessel is achieved in a design which is space efficient and incorporates protections against excessive amounts of liquid being applied to the vegetation.

Although somewhat specific embodiments have been shown, it should be understood that these illustrations have been made by way of example only. Various modifications to the structures shown and to the operating parameters described will be apparent to those of ordinary skill in the art without departing from either the spirit or scope of the invention.

What is claimed is:

1. A vessel for supporting and automatically providing liquid to vegetation, comprising:
    (a) a lower container for storing a reservoir of liquid;
    (b) a vegetation supporting upper container having upper and lower portions of relatively larger and smaller cross-sectional areas respectively, said upper portion engageable with said lower container, said lower portion extending from said upper portion and having a shaped end, said lower portion also defining near said end at least one passageway extending into said lower container for conveying a flow of liquid to the vegetation; and
    (c) a flow regulator movably secured to said lower portion and defining at least one flow port of dimensions having a selected relationship to the cross-sectional dimensions of said passageway, said flow regulator configured substantially in the shape of said end to selectively enable at least partial alignment of said passageway and said flow port upon relative motion between said lower portion and said flow regulator, said flow regulator further including means actuable from a position external of said vessel for moving the flow regulator relative to said portion, thereby permitting the regulation of the flow of said liquid without separating the upper container from the lower container.

2. The vessel of claim 1, wherein said lower container includes an aperture and the moving means of said flow regulator comprises a control lever attached at an inner end to that portion of the flow regulator which defines the flow port, and having an outer end extending at least to said aperture.

3. The vessel of claim 1, wherein said lower portion is a protruding stem and said flow regulator comprises a cap rotatably attachable to said stem, said cap having an aperture for defining said flow port.

4. The vessel of claim 3, wherein said stem defines an annular ridge disposed upon its outer surface and wherein the cap defines an annular groove disposed upon its inner surface, said groove cooperating with said ridge when the cap is attached to the stem to effect a fluid-tight seal between said cap and said upper container while permitting relative rotation therebetween.

5. The vessel of claim 1, wherein said upper container comprises a main body for supporting the vegetation and said lower portion extends from a bottom surface of the main body, said main body defining at least one drainage hole in the bottom surface, and wherein said lower container includes at least one fill/drain opening located below the level of said drainage hole and above the level of said passageway, thereby permitting excess liquid to drain from said upper container, permitting the replenishment of liquid in said lower container, and permitting aeration of said vegetation even when said vessel contains a full reservoir of liquid in the lower container.

6. The vessel of claim 5, wherein said lower container further comprises a splash shield disposed subjacent said fill/drain opening to reduce the inadvertent spillage of liquid therethrough.

7. The vessel of claim 1, wherein said lower container is externally dimensioned to fit at least partially within said upper container, thereby permitting the nesting of a plurality of said vessels for facilitating storage and shipment.

8. The vessel of claim 1, wherein the diameter of said upper container diminishes from a larger diameter at the uppermost level of said upper container to a medium diameter where said upper container engages said lower container and the diameter of said lower container diminishes from said medium diameter where said lower container engages said upper container to a smaller diameter at the lowermost level of said lower container.

9. The vessel of claim 8, wherrein said upper container further comprises:
an annular shoulder extending radially inward, the lower surface of said annular shoulder being engageable with the upper surface of said lower container for firmly supporting said upper container on said lower container.

10. The vessel of claim 1, wherein said lower container is transparent, thereby permitting the viewing of said liquid from outside the vessel.

* * * * *